United States Patent
Dang et al.

(10) Patent No.: US 12,480,555 B2
(45) Date of Patent: Nov. 25, 2025

(54) SYSTEM AND METHOD FOR CONTROLLING A PLURALITY OF SENSORS

(71) Applicant: Bendix Commercial Vehicle Systems LLC, Avon, OH (US)

(72) Inventors: Khoi M Dang, Avon Lake, OH (US); Thomas J. Hayes, Lakewood, OH (US); Michael D. Cremona, Lakewood, OH (US); Tandi Wijaya, Highland Heights, OH (US)

(73) Assignee: Bendix Commercial Vehicle Systems LLC, Avon, OH (US)

(*) Notice: Subject to any disclaimer, the term of this patent is extended or adjusted under 35 U.S.C. 154(b) by 166 days.

(21) Appl. No.: 17/987,916

(22) Filed: Nov. 16, 2022

(65) Prior Publication Data
US 2024/0159287 A1    May 16, 2024

(51) Int. Cl.
*F16D 66/02*    (2006.01)
*B60T 8/88*    (2006.01)
(Continued)

(52) U.S. Cl.
CPC ............ *F16D 66/027* (2013.01); *B60T 8/885* (2013.01); *B60T 17/221* (2013.01); *G01L 5/28* (2013.01); *H04B 3/54* (2013.01)

(58) Field of Classification Search
CPC . F16D 66/027; H04B 3/54; G01L 5/28; B60T 17/221; B60T 8/885; B60T 17/22; B60T 17/228
(Continued)

(56) References Cited

U.S. PATENT DOCUMENTS

| | | | |
|---|---|---|---|
| 7,359,775 B2* | 4/2008 | Strege | G01B 21/26 701/34.3 |
| 7,737,880 B2* | 6/2010 | Vacanti | G01S 13/87 342/159 |

(Continued)

FOREIGN PATENT DOCUMENTS

| | | | | |
|---|---|---|---|---|
| AU | 2020251893 A1 * | 9/2021 | | F16D 55/2255 |
| CA | 3065071 A1 * | 8/2020 | | G01D 9/005 |

(Continued)

OTHER PUBLICATIONS

Wilson ML et al: "An Optical Network of Silicon, Micromachined Sensors", Miniaturized Systems With Micro-Optics and Micromechanics. San Jose, Jan. 30-31, 1996; [Proceedings of Spie], Bellingham, Spie, US , vol. 2687, Jan. 30, 1996 (Jan. 30, 1996), pp. 78-88, XP002066709, ISBN: 978-0-8194-2061-9 (Year: 1996).*
(Continued)

*Primary Examiner* — Stephanie E Bloss
*Assistant Examiner* — Kevin C Butler
(74) *Attorney, Agent, or Firm* — Reising Ethington P.C.

(57) ABSTRACT

A system for controlling a plurality of sensors includes a plurality of filters each of which is configured to provide power transmitted at distinct frequencies to a corresponding sensor of the plurality of sensors to thereby active the corresponding sensor and cause the corresponding sensor to generate a data signal. A power frequency controller is configured to adjust a frequency of power from a power source and to transmit power at distinct frequencies at different points in time in order to activate each of the plurality of sensors at different times. A sensor controller may be configured to receive the data signal from each of the sensors over a common conductor and on a common pin and may also act as the power source providing the power to the power frequency controller.

20 Claims, 3 Drawing Sheets

(51) Int. Cl.
  *B60T 17/22* (2006.01)
  *G01L 5/28* (2006.01)
  *H04B 3/54* (2006.01)
(58) Field of Classification Search
  USPC .......................................................... 73/121
  See application file for complete search history.

(56) References Cited

U.S. PATENT DOCUMENTS

| | | | |
|---|---|---|---|
| 9,360,548 B2 * | 6/2016 | Kato | G01S 7/023 |
| 9,685,823 B2 * | 6/2017 | O'Sullivan | H02J 13/00034 |
| 9,878,741 B2 * | 1/2018 | Cirillo | B62D 6/10 |
| 11,215,252 B2 * | 1/2022 | Ruiz | F16D 66/027 |
| 11,579,900 B2 * | 2/2023 | Blumenthal | G06F 9/44505 |
| 12,331,950 B2 * | 6/2025 | Hunt | F24F 11/66 |
| 2005/0154497 A1 * | 7/2005 | Strege | G05B 23/0221 |
| | | | 700/279 |
| 2010/0097263 A1 * | 4/2010 | Vacanti | G01S 7/35 |
| | | | 342/70 |
| 2012/0229323 A1 * | 9/2012 | Kato | G01S 7/0232 |
| | | | 342/27 |
| 2020/0096391 A1 * | 3/2020 | Hassel | G01J 5/10 |
| 2020/0309217 A1 * | 10/2020 | Ruiz | F16D 66/027 |
| 2021/0107503 A1 * | 4/2021 | Zula | B60T 7/22 |
| 2022/0329656 A1 * | 10/2022 | Lee | H04Q 9/00 |
| 2023/0287951 A1 * | 9/2023 | Muniraju | F16D 66/021 |
| 2024/0159287 A1 * | 5/2024 | Dang | F16D 66/027 |

FOREIGN PATENT DOCUMENTS

| | | | | |
|---|---|---|---|---|
| CA | 3095183 A1 | * | 4/2021 | ......... B60R 16/0231 |
| CN | 110023728 A | * | 7/2019 | ................ G01J 5/10 |
| CN | 115175014 A | * | 10/2022 | ............. H04Q 1/28 |
| DE | 102008036034 A1 | * | 2/2010 | ........... F16D 65/567 |
| EP | 0846404 B1 | | 10/2002 | |
| EP | 3703259 A2 | * | 9/2020 | ............. G01D 9/005 |
| EP | 3622783 B1 | * | 6/2024 | ........... H05B 47/185 |
| JP | H10334357 A | * | 12/1998 | |
| KR | 20230141572 A | * | 10/2023 | ............. B60T 13/74 |
| WO | WO-2018109274 A1 | * | 6/2018 | ................ G01J 5/10 |
| WO | WO-2019132752 A1 | * | 7/2019 | .......... G06F 11/3003 |
| WO | WO-2020205343 A1 | * | 10/2020 | ............. F16D 66/027 |
| WO | WO-2024107337 A1 | * | 5/2024 | ............. B60T 8/885 |

OTHER PUBLICATIONS

English (machine) translation of Japanese Pub. No. H10-334357 A.
Wilson, Mark L et al. "An Optical Network of Silicon Micromachined Sensors," SPIE vol. 2687 pp. 78-88 (1996).
International Search Report issued in corresponding International (PCT) App. No. PCT/US2023/036559 (Feb. 7, 2024).
Written Opinion issued in corresponding International (PCT) App. No. PCT/US2023/036559 (Feb. 7, 2024).

* cited by examiner

SYSTEM AND METHOD FOR CONTROLLING A PLURALITY OF SENSORS

BACKGROUND OF THE INVENTION a. Field of the Invention

This invention relates to systems and methods for controlling a plurality of sensors. In particular, the invention relates to a system and method for controlling activation of the sensors and generation of data signals from the sensors in a manner that allows for identification of data signals from individual sensors while also minimizing the number of signal paths required for transmission and reception of the data signals.

b. Background Art

In many applications, a plurality of sensors may be used to determine values for the same parameter such as temperature or pressure. In some applications, multiple sensors may be used provide redundancy or validation under conditions in which the value of the parameter determined by each sensor is expected to be the same. In other applications, multiple sensors may be used to determine the value of a parameter under conditions in which the value of the parameter determined by each sensor is expected to vary. For example, a plurality of temperature sensors may be used to determine temperatures in different physical locations.

In applications employing multiple sensors to determine values for the same parameter it is advantageous to use a single controller to process data signals generated by the sensors to avoid duplication of processing resources and related drawbacks such as increased costs and weight and packaging constraints. In order for a single controller to process data signals from multiple sensors and subsequently make use of the data, however, the controller must be able to identify the individual sensor that generated the data signal. In some conventional systems, identification of individual sensors has been accomplished by transmitting data signals from each sensor along different conductors to different pins on the controller. The use of different signal paths for data signals from each sensor, however, increases part count, cost and size (e.g., from increased wiring) and requires relatively large controllers and/or limits the use of available pins on the controller. In addition, these conventional systems often route power between the controller and sensors using different conductors and pins on the controller for each sensor thereby exacerbating the disadvantages of such systems. In other conventional systems, identification of individual sensors is accomplished by encoding the data signals with information unique to each sensor that allows the controller to identify the sensor that transmitted the data signal. This type of system, however, requires the development and use of specific communication protocols and additional hardware to encode and decode the signals. These systems also frequently require the use of multiple different sensors that are not interchangeable despite measuring the same parameter.

The inventors herein have recognized a need for a system and method for controlling a plurality of sensors that will minimize and/or eliminate one or more of the above-identified deficiencies.

BRIEF SUMMARY OF THE INVENTION

This invention relates to systems and methods for controlling a plurality of sensors. In particular, the invention relates to a system and method for controlling activation of the sensors and generation of data signals from the sensors in a manner that allows for identification of data signals from individual sensors while also minimizing the number of signal paths required for transmission and reception of the data signals.

One embodiment of a system for controlling a plurality of sensors includes a first filter configured to provide power transmitted at a first frequency to a first sensor of the plurality of sensors to thereby activate the first sensor and cause the first sensor to generate a first data signal. The system further includes a second filter configured to provide power transmitted at a second frequency different from the first frequency to a second sensor of the plurality of sensors to thereby activate the second sensor and cause the second sensor to generate a second data signal. The system further includes a power frequency controller configured to adjust a frequency of power from a power source to transmit power at the first frequency at a first time and adjust the frequency of the power from the power source to transmit power at the second frequency at a second time different from the first time.

Another embodiment of a system for controlling a plurality of sensors includes a first filter configured to provide power transmitted at a first frequency to a first sensor of the plurality of sensors to thereby activate the first sensor and cause the first sensor to generate a first data signal. The system further includes a second filter configured to provide power transmitted at a second frequency different from the first frequency to a second sensor of the plurality of sensors to thereby activate the second sensor and cause the second sensor to generate a second data signal. The system further includes a sensor controller configured to output power, receive the first data signal and receive the second data signal. The system further includes a power frequency controller configured to receive power from the sensor controller, adjust a frequency of the power to transmit power at the first frequency at a first time, and adjust the frequency of the power to transmit power at the second frequency at a second time different from the first time.

One embodiment of a method for controlling a plurality of sensors includes selecting a first sensor of the plurality of sensors and adjusting a frequency of power from a power source to transmit power at a first frequency corresponding to the first sensor. The method further includes activating only the first sensor of the plurality of sensors responsive to the power at the first frequency. The first sensor generates a first data signal upon activation of the first sensor. The method further includes selecting a second sensor of the plurality of sensors and adjusting the frequency of the power from the power source to transmit power at a second frequency corresponding to the second sensor. The second frequency is different from the first frequency. The method further includes activating only the second sensor of the plurality of sensors responsive to the power at the second frequency. The second sensor generates a second data signal upon activation of the second sensor.

A system and method for controlling a plurality of sensors in accordance the present teachings represent an improvement as compared to conventional systems and methods. In particular, the system and method disclosed herein allow a controller to identify the sensor generating the data signal while also minimizing the number of signal paths between the sensors and the controller thereby reducing the number of conductors required to carry the data signals and the number of pins required on the controller. As a result, the system requires fewer parts, is less costly and occupies less space than conventional systems. The system also limits the size requirements for the controller and/or preserves pins on the controller for other uses. The system and method disclosed herein also avoid the need for the development and use of specific communication protocols to identify communications from individual sensors and the additional hardware to encode and decode the signals and also facilitate interchangeability of sensors.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
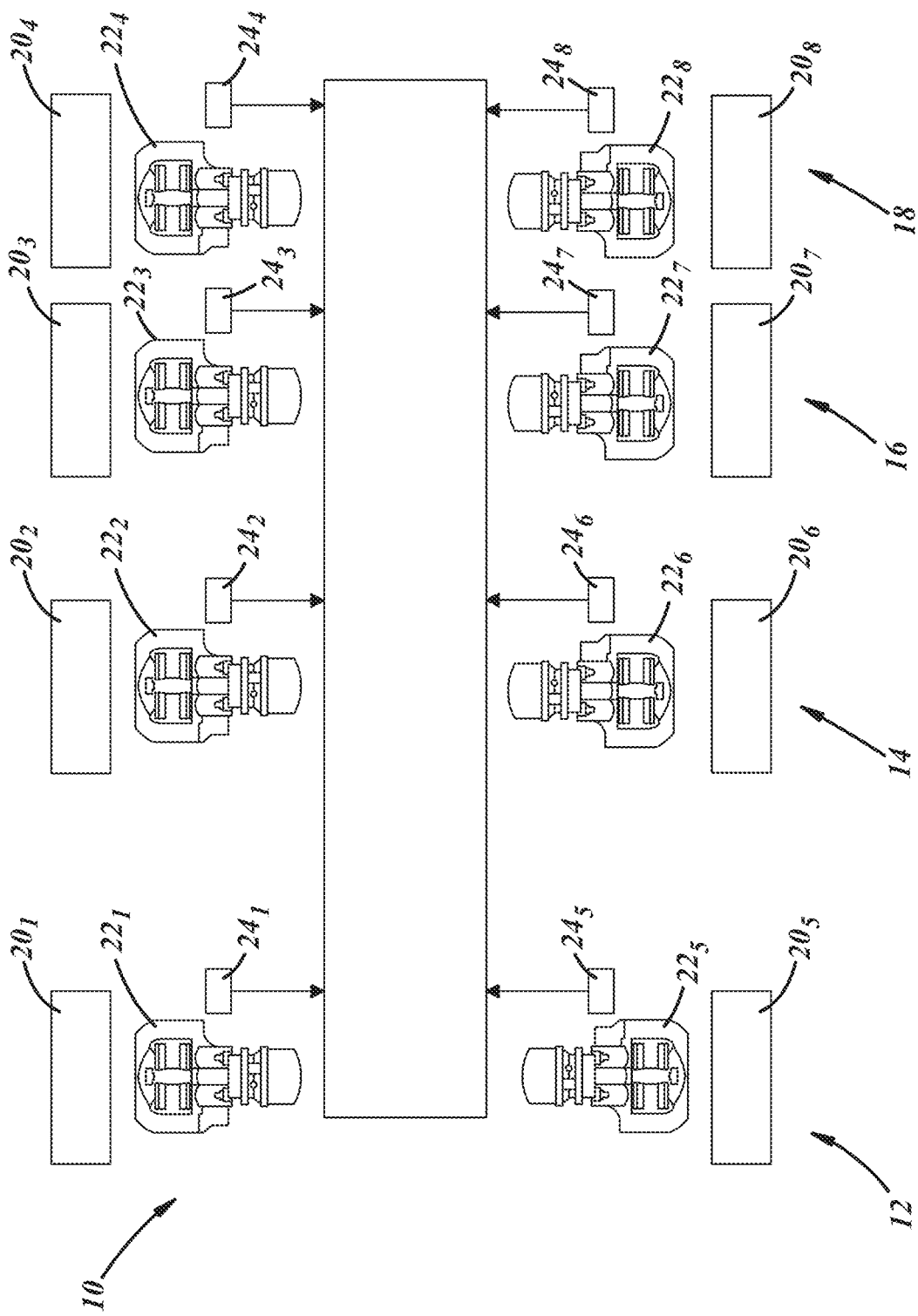
FIG. 1 is a diagrammatic view of a vehicle including one embodiment of a system for controlling a plurality of sensors on the vehicle.

Referring now to the drawings wherein like reference numerals are used to identify identical components in the various views, FIG. 1 illustrates a vehicle 10 and, in particular, a truck or tractor for a tractor-trailer (also referred to as a semi). Vehicle 10 contains a power unit, such as an internal combustion engine (not shown) and steering and drive axles 12, 14. In the illustrated embodiment, vehicle 10 further includes a pair of additional rear axles 16, 18. Each axle 12, 14, 16, 18 supports one or more wheels 20 at either end (labeled as 201, 202, 203, 204, 205, 206, 207, 208, in FIG. 1). Vehicle 10 further includes a plurality of wheel brakes 22 (labeled as 221, 222, 223, 224, 225, 226, 227, 228, in FIG. 1), a corresponding plurality of sensors 24 (labeled as 241, 242, 243, 244, 245, 246, 247, 248, in FIG. 1) for measuring wear of the brake pads and/or a rotor and a system 26 for controlling sensors 24 in accordance with the present teachings.

Wheel brakes 22 are provided to apply a braking torque to wheels 20 in order to slow or halt rotation of wheels 20. In the illustrated embodiment, brakes 22 comprise disc brakes in which a carrier supports brake pads on opposite sides of a rotor rotating with the wheel 20 and an actuator causes, responsive to fluid pressure delivered by a fluid circuit or another force, movement of a caliper relative to the carrier to move the brake pads into and out of engagement with the rotor. Alternatively, wheel brakes 22 may comprise drum brakes in which an actuator such as a cam or piston causes, responsive to fluid pressure delivered by a fluid circuit or another force, movement of one or more brake shoes carrying brake pads into engagement with a braking surface in a brake drum rotating with the wheel 22. Wheel brakes 22 may be configured to function as both a service brake for applying service braking while vehicle 10 is an active state and as a parking brake for applying parking or emergency braking while vehicle 10 is an active or inactive state.

Sensors 24 determine the amount of wear on brake pads and/or the rotor within brakes 22. Sensors 24 may, for example, output an indication of remaining brake wear life indicative of the remaining material on the brake pads and/or rotor. Sensors 24 may determine the amount of wear responsive to rotation of a component in an adjustment mechanism that automatically adjusts the position of the brake pads to account for wear on the brake pads and/or rotor and maintain brake stroke. Adjustment mechanisms are conventional in the art and exemplary adjustment mechanisms for disc brakes are shown in U.S. Pat. No. 7,926,626 B2 and U.S. Pub. No. 2011/0155518 A1, the entire disclosures of which are incorporated herein by reference. In some embodiments, sensors 24 may comprise potentiometers having a resistive element whose resistance varies responsive to rotation of a component in the adjustment mechanism or slide potentiometers whose resistance varies in response to linear motion of a component in the adjustment mechanism. Such sensors are conventional in the art and an exemplary sensor is shown in U.S. Pat. No. 11,215,252 B2, the entire disclosure of which is incorporated herein by reference. It should be understood that sensors 24 may assume other forms such as a Hall effect sensor, an encoder or resolver. Sensors 24 generate data signals and transmit the signals to system 26.

Figure 2:
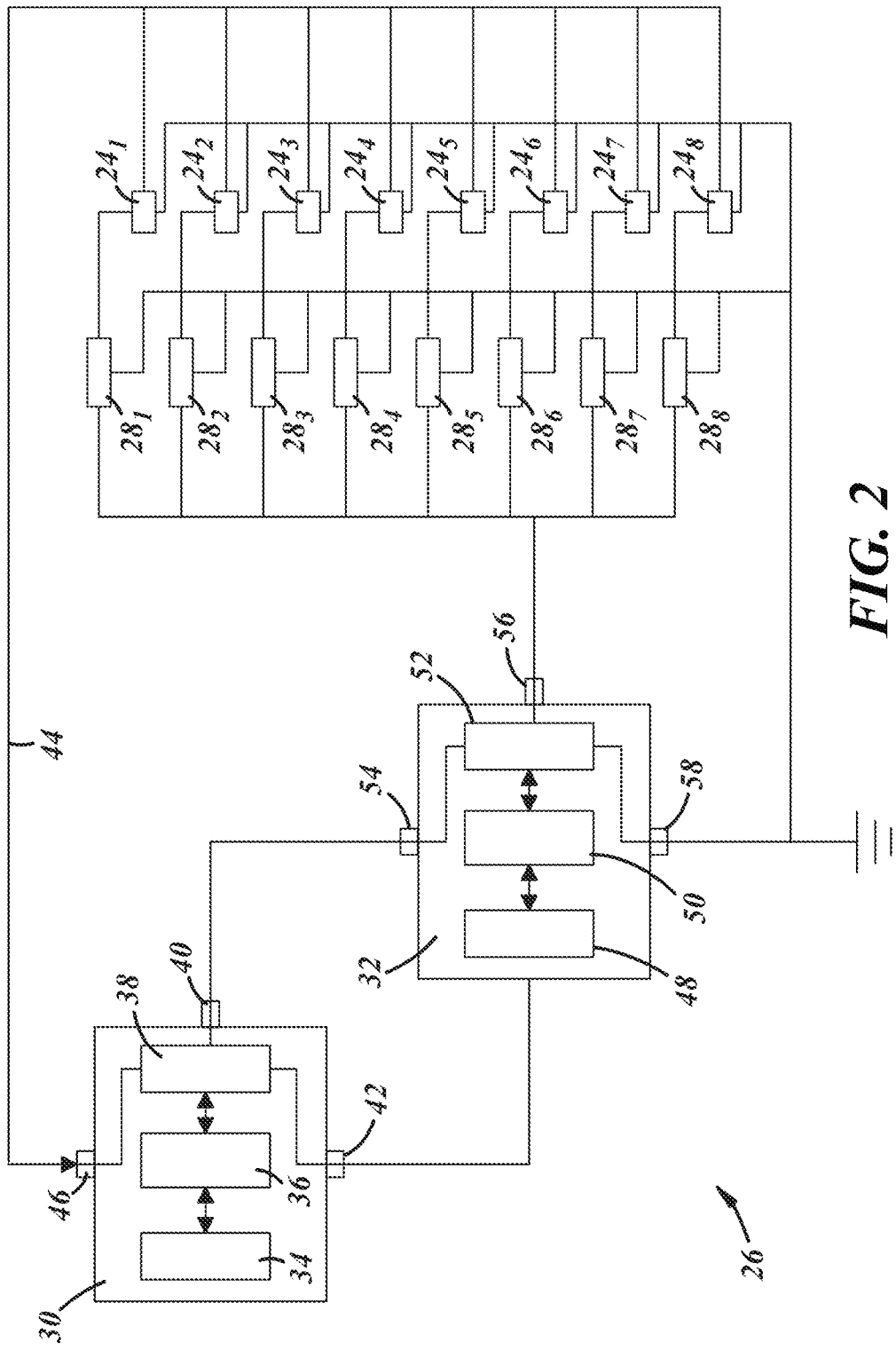
FIG. 2 is a diagrammatic view of one embodiment of a system for controlling a plurality of sensors.

System 26 is provided to control sensors 24. In accordance with the teachings herein, system 26 controls activation of sensors 24 and generation of data signals from sensors 24 in a manner that allows for identification of data signals from individual sensors 24 without the use of multiple signal paths for transmission and reception of the data signals from each sensor and without requiring the use of specific data communication protocols. Referring now to FIG. 2, system 26 may include a plurality of filters 28 (labeled as 281, 282, 283, 284, 285, 286, 287, 288, in FIG. 1), a sensor controller 30, and a power frequency controller 32.

Filters 28 are provided to control the delivery of power to each sensor 24. Filters 28 may comprise bandpass filters. Each filter 28 is configured to deliver power output by power frequency controller 32 to a corresponding sensor 24 provided the power is transmitted at a frequency within a predetermined frequency range. The predetermined frequency range for each filter 28 is different and preferably does not overlap with the frequency range for any other filter 28. For example, one filter may 28 may deliver power transmitted at frequencies between 0 Hz and 1000 HZ, another filter 28 may deliver power transmitted at frequencies between 1200 and 2200 HZ, etc. Therefore, power transmitted from frequency controller 32 at any particular frequency will at most be delivered to one of sensors 24 and only one of sensors 24 will be activated and generate a data signal. It should be understood that the identified frequency ranges are exemplary only and, further, that filters 28 do not have to have equal ranges.

Sensor controller 30 is provided to process data signals from sensors 24. Controller 30 may also provide data signals to other vehicle systems indicative of measurements made by sensors 24 and/or control signals to other vehicle systems to cause an action in response to the measurements made by sensors 24. Controller 30 may comprise a programmable microprocessor or microcontroller or may comprise an application specific integrated circuit (ASIC). Controller 30 may include a memory 34 and a central processing unit (CPU) 36. Controller 30 may also include an input/output (I/O) interface 38 including a plurality of input/output pins or terminals through which controller 30 may receive a plurality of input signals and transmit a plurality of output signals. The input signals may include data signals received from sensors 24 while the output signals may include data signals and/or control signals directed to other vehicle systems. Controller 30 may also receive power from an external power source (e.g., a vehicle battery) and provide power through interface 38 for use in activating sensors 24 and may be connected to other vehicle systems through interface 38 through a conventional vehicle communication bus implementing a controller area network (CAN) or local interconnect network (LIN). In accordance with one aspect of the present teachings, the number of pins in interface 38 of controller 30 used to control sensors 24 is significantly reduced relative to conventional systems. In particular, power used to activate sensors 24 is output from sensor controller 30 to power frequency controller 32 through a single pin 40 and returned to sensor controller 30 through a single pin 42. Further, data signals generated by all of sensors 24 are transmitted along the same conductor 44 and input to sensor controller 30 through a single pin 46. For comparison, in one prior art system for controlling bread wear sensors in the configuration illustrated in FIG. 1 (i.e. a total of eight sensors 241, 242, 243, 244, 245, 246, 247, 248 used in determining brake wear in eight vehicle brakes 221, 222, 223, 224, 225, 226, 227, 228 acting on wheels 201, 202, 203, 204, 205, 206, 207, 208 mounted on four axles 12, 14, 16, 18), power was output to the sensors 241, 242, 243, 244, 245, 246, 247, 248 from the controller using three pins of the controller and associated conductors and returned to the controller using another three pins of the controller and associated conductors (power transmission and return for the sensors 243, 244, 247, 248 on two of the four axles 16, 18 used the same pins and conductors). Further, in this prior art system, each sensor 241, 242, 243, 244, 245, 246, 247, 248 transmitted a data signal along a distinct conductor to a distinct pin of the controller. Therefore, the prior art system required a total of fourteen pins on the controller and associated conductors as opposed to three pins 40, 42, 46 and associated conductors in system 26.

Power frequency controller 32 is provided to control the frequency of power transmitted from sensor controller 30 to sensors 24 and, therefore, the activation of individual sensors 24. Controller 32 may again comprise a programmable microprocessor or microcontroller or may comprise an application specific integrated circuit (ASIC). Controller 32 may include a memory 48 and a central processing unit (CPU) 50. Controller 32 may also include an input/output (I/O) interface 52 including a plurality of input/output pins or terminals through which controller 32 may receive a plurality of input signals and transmit a plurality of output signals. Controller 32 may receive power from controller 30 through a pin 54 of interface 52 and output power at selected frequencies through a pin 56 of interface 52 for use in activating sensors 24. Another pin 58 of interface 52 may be tied to a common ground for sensors 24, filters 28 and controller 32. In the illustrated embodiment, a single power frequency controller 32 is shown. It should be understood, however, that the functionality of controller 32 described herein may be divided among multiple sub-controllers. In accordance with the present teachings, controller 32 may be configured with appropriate programming instructions (i.e., software or a computer program) to implement several steps in a method for controlling a plurality of sensors 24 described below.

Figure 3:
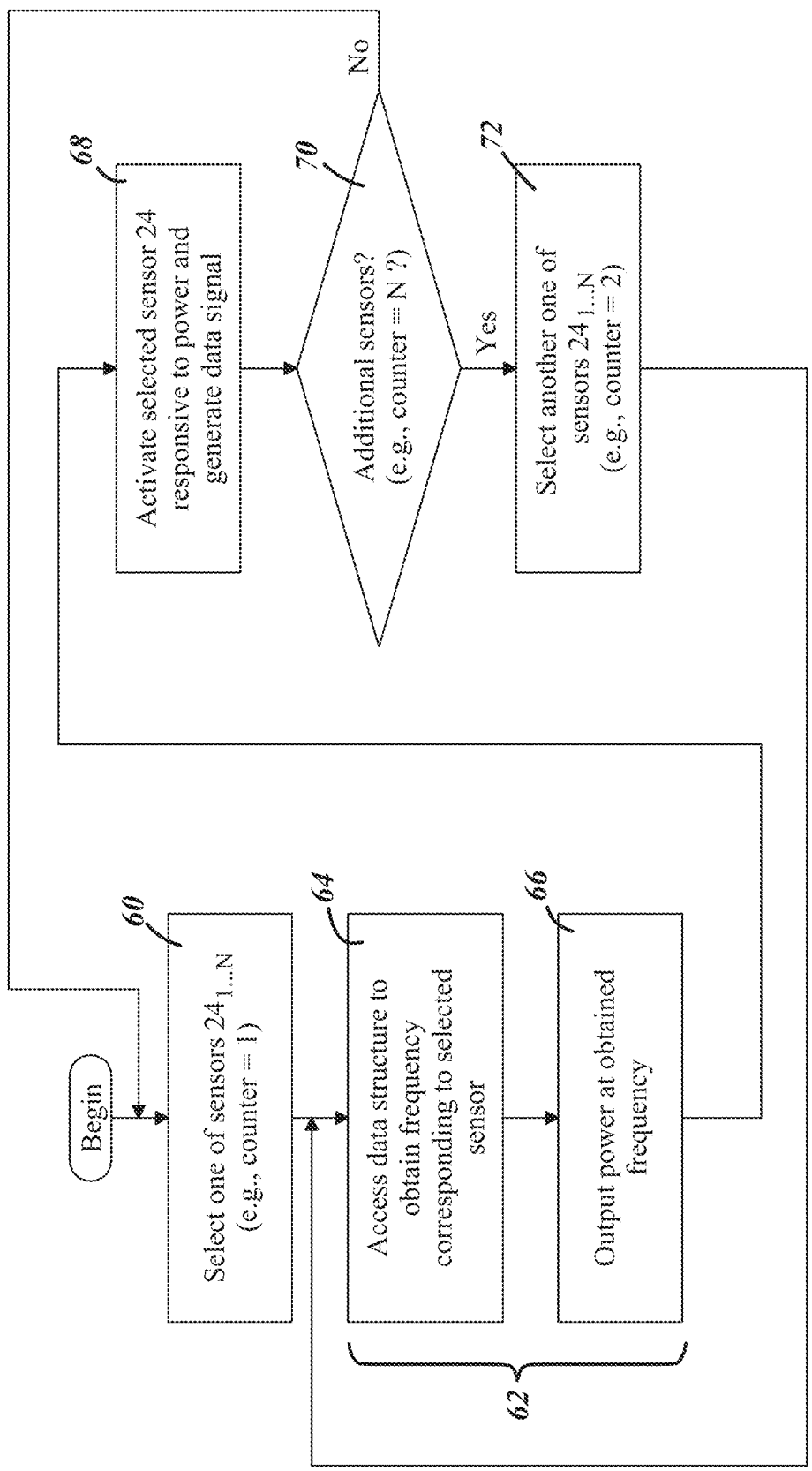
FIG. 3 is a flow chart diagram illustrating steps in one embodiment of a method for controlling a plurality of sensors.

Referring now to FIG. 3, one embodiment of a method for controlling a plurality of sensors is shown. The method may be initiated any time power is received by power frequency controller 32 from sensor controller 30. Sensor controller 30 may output power to power frequency controller under various conditions depending on the application. In vehicle 10, sensor controller 30 may, for example, output power to power frequency controller 32 whenever vehicle 10 is in an active state (i.e., a state in which a battery on the vehicle is delivering current to the power unit in vehicle 10 (e.g., an internal combustion engine or electric motor) to generate mechanical energy required to rotate the wheels 20 of vehicle 10). Alternatively, sensor controller 30 may output power to power frequency controller 32 at predetermined time periods or in response to specific conditions (e.g., a command from an operator of vehicle 10 or a condition identified by one or more systems on vehicle 10).

The method may begin with the step 60 of selecting one of the plurality of sensors 24 to which power will be provided in order to activate the selected sensor and generate a data signal indicative of brake wear for a corresponding wheel brake 22. In accordance with one embodiment, step 60 may include setting a counter to a predetermined initial value corresponding to one of the plurality of sensors 24.

The method may continue with the step 62 of adjusting a frequency of the power from a power source such as sensor controller 30 to allow transmission of power at a predetermined frequency. Power frequency controller 32 may include an oscillator that is configured to adjust the frequency of power output through pin 56 of controller 32. The predetermined frequency is selected such that the power will pass through only the filter 28 coupled to the sensor 24 selected in step 60. As discussed hereinabove, because each filter 28 is configured to provide power transmitted at frequencies falling within specific frequency ranges that preferably do not overlap, only one sensor 24 will be activated in response to the power output by sensor controller 32 at the selected frequency. Step 62 may include several substeps 64, 66. In substep 64, controller 32 may access a data structure such as a look up table correlating each sensor 24 with a predetermined frequency. Controller 32 may, for example, use the value of the counter to retrieve the predetermined frequency from the data structure which may be located within memory 48 or another memory. In substep 64, controller 32 may cause the oscillator to output power at the predetermined frequency retrieved from memory 48.

The method may continue with the step 68 of activating one of sensors 24 responsive to the power output by power frequency controller 32 and generating a corresponding data signal. As discussed above, because delivery of power to each sensor 24 is controlled by a different filter 28 and each filter 28 is configured to provide power transmitted at frequencies falling within specific frequency ranges that preferably do not overlap, only the sensor 24 selected in step 60 will be activated. The data signal is transmitted along conductor 44 and enters sensor controller 30 through pin 46. Sensor controller 30 may then process the data signal and output various data signals or control signals in response. For example, sensor controller 30 may communicate information indicative of the degree of wear or remaining life of the brake pads and/or rotor for a given wheel brake 22 directly to the operator of vehicle 10 (e.g., through a display in the vehicle cabin), to other vehicle systems that may have a need for such information in controlling vehicle 10 such as vehicle braking or stability control systems or to a telematics system on vehicle 10 for wireless communication to remote computing systems and personnel (e.g., fleet management). Sensor controller 30 may also transmit control signals configured to cause one or more vehicle systems to act in response to the information obtained from the data signal.

After activating the first sensor 24, the method may continue with the step 70 of determining whether any additional sensors 24 are present and require activation. Step 70 may, for example, including comparing the value of the counter to a predetermined value indicative of the total number of sensors 24 or associated with the final sensor 24 of a plurality of sensors 24. The predetermined number may be stored in a memory such as memory 48. If the comparison indicates that no additional sensors are present and require activation (e.g., if the value of the counter equals the predetermined value), the method may either end or, as shown in the embodiment illustrated in FIG. 3, return to step 60.

If it is determined in step 70 that additional sensors 24 are present and require activation, the method may continue with the step 72 of selecting another one of the plurality of sensors 24 to which power will be provided in order to activate the selected sensor and generate a data signal indicative of brake wear for a corresponding wheel brake 22. In accordance with one embodiment, step 72 may include incrementing the counter to a predetermined value corresponding to another one of the plurality of sensors 24. Thereafter, steps 62, 68, 70, 72 may be repeated until it is determined in step 70 that there are no additional sensors 24 present that require activation. Each time step 62 is performed, power frequency controller 32 will adjust the frequency of the power from sensor controller 30 to allow transmission of power at a different predetermined frequency selected that will allow the power to pass through a filter 28 coupled to the sensor 24 selected in step 72. In this manner, power frequency controller 32 will cause sequential generation of data signals from each sensor 24 in the plurality of sensors 24. Because only one sensor 24 is activated at any given time and because the sensors 24 may be activated in a known order, sensor controller 30 is able to identify the sensor 24 sending each received data signal. Further, the data signals can be sent over a single conductor 44 and through a single pin 46 on controller 30.

A system 26 and method for controlling a plurality of sensors 24 in accordance the present teachings represent an improvement as compared to conventional systems and methods. In particular, the system 26 and method disclosed herein allow a controller to identify the sensor 24 generating the data signal while also minimizing the number of signal paths between the sensors 24 and the controller 30 thereby reducing the number of conductors required to carry the data signals and the number of pins required on the controller 30. As a result, the system 26 requires fewer parts, is less costly and occupies less space than conventional systems. The system 26 also limits the size requirements for the controller 30 and/or preserves pins on the controller 30 for other uses. The system and method disclosed herein also avoid the need for the development and use of specific communication protocols to identify communications from individual sensors 24 and the additional hardware to encode and decode the signals and also facilitate interchangeability of sensors 24.

While the invention has been shown and described with reference to one or more particular embodiments thereof, it will be understood by those of skill in the art that various changes and modifications can be made without departing from the spirit and scope of the invention.

What is claimed is:

1. A system for controlling a plurality of sensors, comprising:
    a first filter configured to provide power transmitted at a first frequency to a first sensor of the plurality of sensors to thereby activate the first sensor and cause the first sensor to generate a first data signal;
    a second filter configured to provide power transmitted at a second frequency different from the first frequency to a second sensor of the plurality of sensors to thereby activate the second sensor and cause the second sensor to generate a second data signal;
    a power frequency controller configured to
        adjust a frequency of power from a power source to transmit power at the first frequency at a first time; and,
        adjust the frequency of the power from the power source to transmit power at the second frequency at a second time different from the first time.

2. The system of claim 1 wherein the first and second data signals are transmitted on the same conductor.

3. The system of claim 1 wherein the power frequency controller transmits power at the first frequency on a first pin of the power frequency controller and transmits power at the second frequency on the first pin of the power frequency controller.

4. The system of claim 1 wherein the first sensor comprises a brake wear sensor for a first wheel brake configured to brake a first wheel and the second sensor comprises a brake wear sensor for a second wheel brake configured to brake a second wheel.

5. The system of claim 1 wherein the first and second sensors comprise potentiometers.

6. The system of claim 1 wherein the power frequency controller is further configured to:
    increment a counter after adjusting the frequency of the power to transmit power at the first frequency and prior to adjusting the frequency of the power to transmit power at the second frequency; and,
    compare the counter to a predetermined number indicative of a total number of sensors in the plurality of sensors.

7. A system for controlling a plurality of sensors, comprising:
    a first filter configured to provide power transmitted at a first frequency to a first sensor of the plurality of sensors to thereby activate the first sensor and cause the first sensor to generate a first data signal;
    a second filter configured to provide power transmitted at a second frequency different from the first frequency to a second sensor of the plurality of sensors to thereby activate the second sensor and cause the second sensor to generate a second data signal;
    a sensor controller configured to
        output power;
        receive the first data signal; and,
        receive the second data signal; and,
    a power frequency controller configured to
        receive power from the sensor controller;
        adjust a frequency of the power to transmit power at the first frequency at a first time; and,
        adjust the frequency of the power to transmit power at the second frequency at a second time different from the first time.

8. The system of claim 7 wherein the sensor controller receives the first data signal on a first pin of the sensor controller and the second data signal on the first pin of the sensor controller.

9. The system of claim 8 wherein the sensor controller outputs power to the power frequency controller on a second pin of the sensor controller and power is returned from the power frequency controller to the second controller through a third pin on the sensor controller.

10. The system of claim 7 wherein the power frequency controller transmits power at the first frequency on a first pin of the power frequency controller and transmits power at the second frequency on the first pin of the power frequency controller.

11. The system of claim 7 wherein the first sensor comprises a brake wear sensor for a first wheel brake configured to brake a first wheel and the second sensor comprises a brake wear sensor for a second wheel brake configured to brake a second wheel.

12. The system of claim 7 wherein the first and second sensors comprise potentiometers.

13. The system of claim 7 wherein the power frequency controller is further configured to:
increment a counter after adjusting the frequency of the power to transmit power at the first frequency and prior to adjusting the frequency of the power to transmit power at the second frequency; and,
compare the counter to a predetermined number indicative of a total number of sensors in the plurality of sensors.

14. A method for controlling a plurality of sensors, comprising:
selecting a first sensor of the plurality of sensors;
adjusting a frequency of power from a power source to transmit power at a first frequency corresponding to the first sensor;
activating only the first sensor of the plurality of sensors responsive to the power at the first frequency, the first sensor generating a first data signal upon activation of the first sensor;
selecting a second sensor of the plurality of sensors;
adjusting the frequency of the power from the power source to transmit power at a second frequency corresponding to the second sensor, the second frequency different from the first frequency; and,
activating only the second sensor of the plurality of sensors responsive to the power at the second frequency, the second sensor generating a second data signal upon activation of the second sensor.

15. The method of claim 14 wherein the power source comprises a sensor controller configured to receive the first data signal on a first pin of the sensor controller and the second data signal on the first pin of the sensor controller.

16. The method of claim 15 wherein the sensor controller outputs power on a second pin of the sensor controller and power is returned to the sensor controller through a third pin on the sensor controller.

17. The method of claim 14 wherein the first sensor comprises a brake wear sensor for a first wheel brake configured to brake a first wheel and the second sensor comprises a brake wear sensor for a second wheel brake configured to brake a second wheel.

18. The method of claim 14 wherein the first and second sensors comprise potentiometers.

19. The method of claim 14 wherein selecting the first sensor of the plurality of sensors includes setting a counter to a value corresponding to the first sensor and selecting the second sensor of the plurality of sensors includes incrementing the counter to a value corresponding to the second sensor.

20. The method of claim 19, further comprising comparing the counter to a predetermined number indicative of a total number of sensors in the plurality of sensors.

* * * * *